Oct. 28, 1969     D. S. WEISS     3,475,037

DOUBLE LOCK TRAILER COUPLING

Filed July 31, 1967     2 Sheets-Sheet 1

DEWEY S. WEISS
INVENTOR

BY
BUCKHORN, BLORE, KLARQUIST & SPARKMAN
ATTORNEYS

Oct. 28, 1969  D. S. WEISS  3,475,037
DOUBLE LOCK TRAILER COUPLING
Filed July 31, 1967  2 Sheets-Sheet 2

DEWEY S. WEISS
INVENTOR

BY
BUCKHORN, BLORE, KLARQUIST & SPARKMAN
ATTORNEYS

United States Patent Office 3,475,037
Patented Oct. 28, 1969

3,475,037
DOUBLE LOCK TRAILER COUPLING
Dewey S. Weiss, 3506 SE. Bybee Blvd.,
Portland, Oreg. 97202
Filed July 31, 1967, Ser. No. 657,339
Int. Cl. B60d 1/00, 1/12
U.S. Cl. 280—504    12 Claims

ABSTRACT OF THE DISCLOSURE

A double lock coupling has a retainer pivotal on a first pin between a closed position and an open position relative to a pintle. A first latch arm pivotal on a second pin and accessible from the top of the coupling is biased toward interlocking engagement with the retainer when the retainer is in either closed or open position. A second latch arm pivotal on the same pin as the retainer and accessible from the top of the coupling is biased against the first latch arm and interlocks with the first latch arm only when the retainer is in its closed position.

---

The invention relates to an improved double lock trailer coupling, and more particularly to a double lock trailer coupling operable from the top thereof.

Double lock trailer hitches of the prior art, as illustrated by those shown in my Patents 2,766,995 and 2,842,-380, have included a retainer which is held selectively in either a closed position relative to a pintle or an open position by a first latch which is in turn, when the retainer is in its closed position, locked in its latching position by second latching means. The second latching means, in one type of prior art couplings, has been a locking arrangement requiring a laterally sliding and pivotal member which must be slid laterally relative to the body of the coupling to release the retainer. Such an arrangement works very well but sometimes rust accumulates and binds the member to make the sliding movement difficult. In another successful type of coupling, the second latching means releases by pivotal movement but requires a laterally projecting handle and the first latch has a handle positioned below the body of the coupling. In this latter type of coupling, the first latch is not readily visible to grasp and release and also has connecting portions extending upwardly in the body which prevent the provision of an air operated friction shoe. It would be desirable to provide a double lock coupling in which the second latching means requires only pivotal movement for its release, and is positioned at the top of the coupling so that it is convenient to the operator for release and to provide space for a friction shoe.

An object of the invention is to provide a new and improved double lock trailer coupling.

Another object of the invention is to provide a double lock trailer coupling operable from the top thereof.

A further object of the invention is to provide a double lock trailer coupling having a second latch which is operable from the top of the coupling and which requires no laterally sliding movement for its release.

Another object of the invention is to provide a double lock trailer coupling having a minimum number of parts, providing space for a locking shoe and releasable by simple pivotal movements.

The invention provides a double lock trailer coupling having a body attachable to a tractor vehicle and including an upwardly directed pintle for engagement with an eye fixed to a trailer. A retainer pivotal on a first pin on the body between a closed position engaging the top of the pintle and an open position is latchable in both positions by a retainer arm pivotal on a second pin parallel to and laterally spaced from the first pin. A latching arm is pivotal on an axis spaced from the second pin to and from a locking position holding the retainer arm in its closed position. Preferably the latching arm is mounted on the first pin.

A complete understanding of the invention may be obtained from the following detailed description of an improved double lock trailer coupling forming a specific embodiment thereof, when read in conjunction with the appended drawings, in which.

Figure 1:
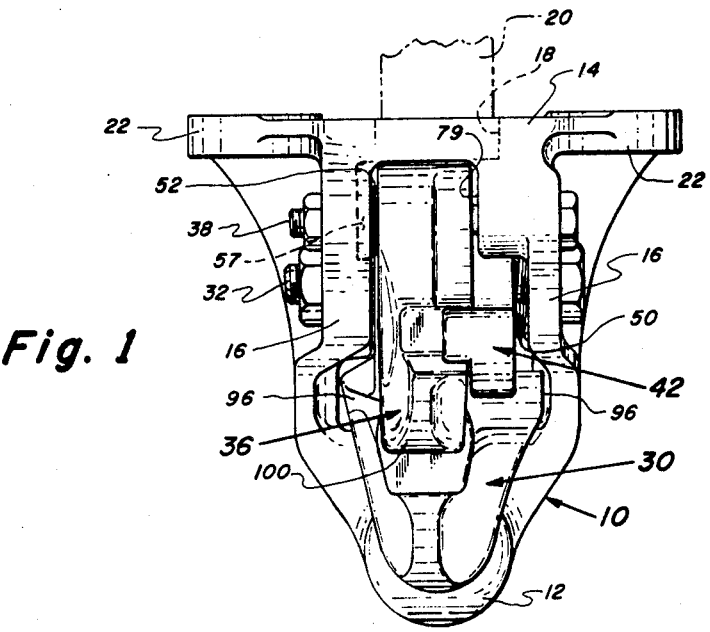
FIG. 1 is a top plan view of an improved double lock trailer coupling forming one embodiment of the invention.

Referring now in detail to the drawings, there is shown therein an improved double lock trailer coupling forming one embodiment of the invention and including an integral body 10 having a forwardly and upwardly extending pintle 12 and a mounting plate 14 from which a pair of spaced sidewalls 16 project forwardly. The mounting plate has an opening 18 through which projects a member 20 carrying a friction shoe (not shown). The pintle is carried by the lower, forward portions of the sidewalls. The plate has thickened eye portions 22 through which fastening screws or bolts (not shown) extend to secure the body to the tractor vehicle.

Figure 4:
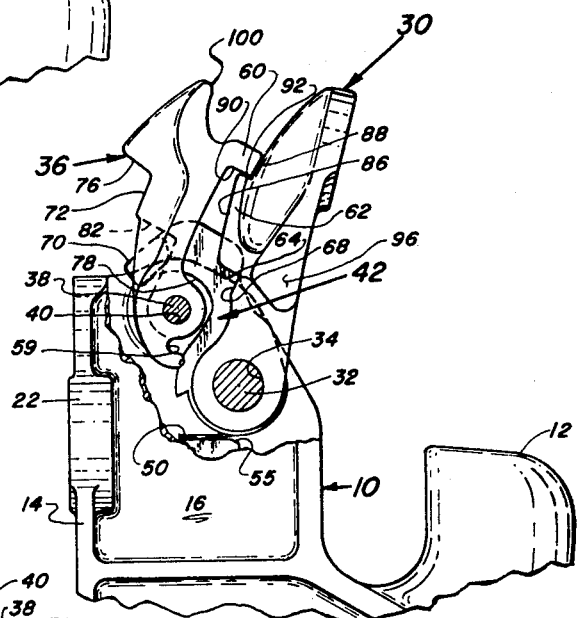

A retainer arm 30 is mounted pivotally on a pin or bolt 32 fitting closely in aligned holes 34 in the upper portions of the side walls 16. The retainer arm is pivotal between a closed position (FIG. 2) engaging the top end of the pintle 12 and an open position (FIG. 4). The retainer arm is rigidly latched in both of these positions by a first or primary latching arm 36, which is pivotal on a bolt 38 mounted in aligned holes 40 in the sidewalls 16. The latching arm 36 is pivotal from a first latching position shown in FIG. 2 locking the retainer arm in its closed position to a second latching position shown in FIG. 4 locking the retainer arm in its open position. A second or secondary latching arm 42 is pivotal on the bolt 32 between a latching position shown in full lines in FIG. 2 locking the first latching arm in its first latching position and a retracted position shown in FIG. 4.

Figure 5:
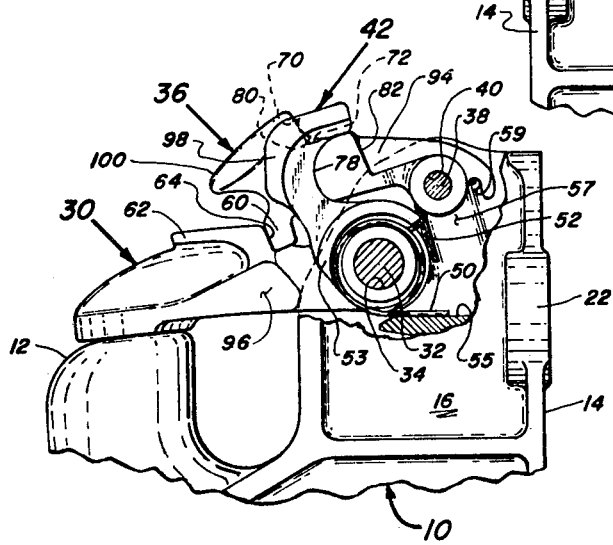
FIG. 5 is a fragmentary, side elevation view of the coupling of FIG. 1.

A torsion spring 50 (FIG. 5) continuously urges the second latching arm 42 counterclockwise, as viewed in FIG. 5, and a torsion spring 52 (FIG. 1) urges the first latching arm 36 continuously in a counterclockwise direction as viewed in FIG. 5. The spring 50 has one end portion hooked over an arcuate, spacing and spring retaining flange 53 on the arm 42 and the other end portion of the spring bears on a ledge 55 of the adjacent sidewall 16. The spring 52 is mounted on the bolt 38 in a socket-like portion 57 in the sidewall remote from the second latching arm. One end portion of the spring 52 is in a groove 59 (FIG. 2) in the arm 36, and the other end portion of the spring 52 bears against one wall of the socket-like portion 57.

Figure 2:
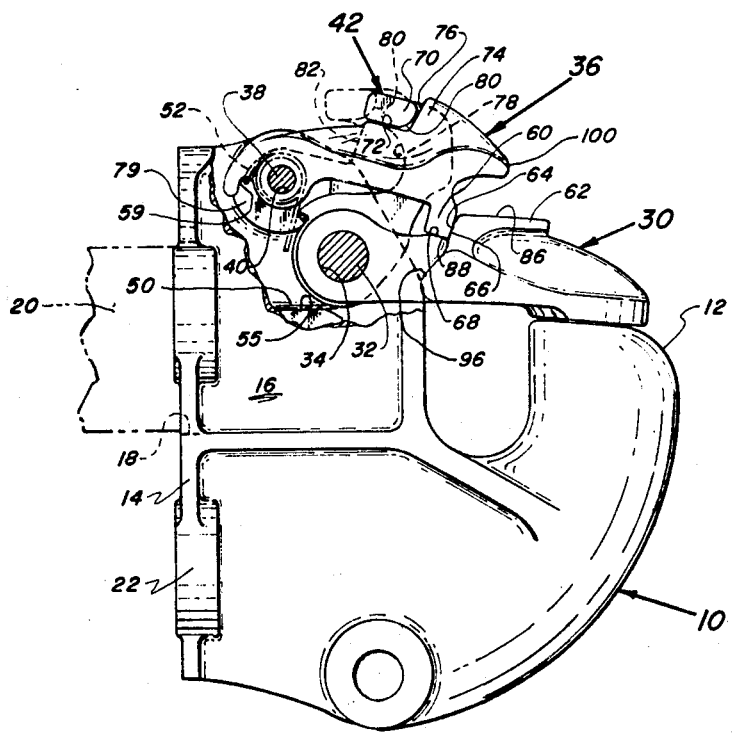
FIG. 2 is a side elevation view of the coupling of FIG. 1.

When the retainer arm 30 is in its closed position and the first latching arm 36 is in its first latching position, as shown in FIG. 2, a locking projection 60 is in front of a raised block 62 of the retainer arm and, whenever the retainer arm is raised slightly, a face 64 of the block 62 engages face 66 of the projection and prevents further raising of the retainer arm. A face 68 of the arm 30 limits downward movement of the latching arm 36 when the arms 30 and 36 are in the positions thereof shown in FIG. 2. In effect, the faces 64 and 68, which are at right angles to each other, form a locking notch, the face 64 preventing releasing movement of the arm 36 when the arm 30 is pressed in a counterclockwise direction. A laterally projecting pin or rounded dog 70 of the second latching arm 42 overhangs an upper face 72 of the arm 36 to prevent counterclockwise movement of the arm 36 away from its first latching position when the arms 30, 36 and 42 are in the full line positions thereof shown in FIG. 2, in which position of the arms the arm 42 extends substantially transversely of the arm 36. A raised portion or block 74 of the arm 36 limits clockwise movement of the arm 42, as viewed in FIG. 2, beyond the latching position of the arm 42. The face 72 and a face 76 on the block 74 substantially transverse to the face 72 form a trapping notch which prevents movement of the pin 70 away from its latching position when the arm 36 is urged in a counterclockwise direction and the arm 42 is in its latching position. The arm 36 is curved or recessed at 78 to provide clearance for a boss 79 (FIG. 1) on one of the sidewalls 16.

Figure 3:
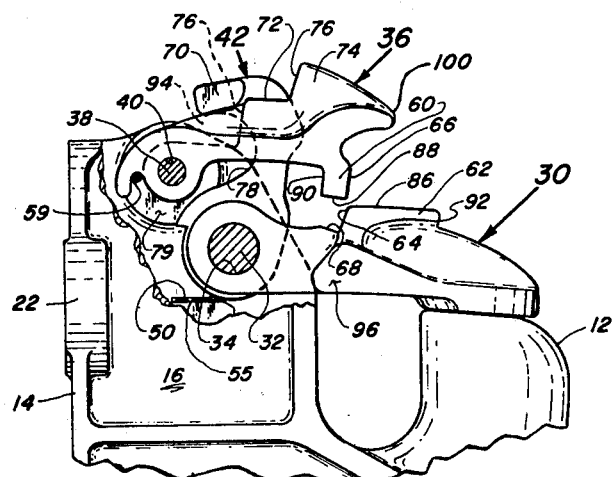
FIGS. 3 and 4 are fragmentary, side elevation views similar to FIG. 2 but with elements of the coupling in different positions.

To open the coupling, the user pushes the arm 42 counterclockwise, as viewed in FIG. 2, to a releasing position shown in broken lines in FIG. 2 in which the pin 70 is almost completely to the left of the face 72 with only a portion of rounded portion 80 of the pin 70 overhanging the face 72. The user then swings the first latching arm counterclockwise from the position thereof shown in FIG. 2 at least to a releasing position thereof shown in FIG. 3 in which a face 82 of the arm 36 engages the rounded portion 80 of the pin. The user then swings the retainer arm 30 counterclockwise as viewed in FIG. 3 until a top face 86 of the block engages bottom face 88 of the locking projection 60. The arm 30 then is pushed further counterclockwise back to its open position shown in FIG. 4 which pushes the arms 36 and 42 to the positions thereof shown in FIG. 4. During this movement, the projection 60 slides along the face 86 of the block and, at the end of this movement, the projection 60 moves off the face 86 and snaps over the upper end of the block 62 and a face 90 of the projection 60 hooks over a face 92 of the block 62 to lock the retainer arm 30 in its open position. During this movement, the face 82 of the arm 36 presses against the projection 70 to swing the arm 42 backwardly, a recess 94 in the arm 36 providing clearance for the pin 70 during this movement. The faces 90 and 92 are parallel at this time and are in such a plane relative to the bolts 32 and 38 that there is a slight hooking action of the face 90 on the face 92. Laterally projecting portions 96 (FIGS. 1, 2 and 5) on the retainer arm 30 engage the edges of the sidewalls 16 at a point in the movement of the arm 30 just slightly beyond the open position of the arm to limit movement of the arm 30. An overhanging arcuate flange 98 (FIG. 5) engages the adjacent sidewall 16 to limit the clockwise movement of the arm 42, as viewed in FIG. 5, just beyond the extreme movement of the retainer arm 30. The arm 42 limits extreme opening movement of the arm 36. Even when in these extreme open positions, the arms 30 and 36 incline somewhat rearwardly so that gravity tends to move them toward their closed and first latching positions, respectively. When in its latching position, the arm 42 also is inclined rearwardly so that gravity tends to hold it in its latching position.

To close the retainer arm 30, the user merely pushes a handle portion 100 of the first latching arm 36 to the left as viewed in FIG. 4 to a position releasing the retainer arm 30. The arm 30 then swings clockwise from gravity action from its open position shown in FIG. 4 to its closed position shown in FIG. 2. The user then releases the first latching arm 36, and the arms 36 and 42 are swung both by spring action and by gravity clockwise as viewed in FIG. 4 from their positions shown in FIG. 4 to their latching position shown in full lines in FIG. 2.

The faces 90 and 92 are positioned at such relative angles on the arms 36 and 42 and at such distances from the bolts 32 and 38 and the bolts 32 and 38 are so spaced apart that the projection 60 positively blocks counterclockwise movement of the arm 30 from its closed position when the arms 30 and 36 are in the positions thereof shown in FIG. 2. However, after the second latching arm has been moved from its latching position, the arm 36 can be moved against its spring freely out of its latching position. Similarly, the arm 42 when in the full line position shown in FIG. 2 positively locks the arm 36 in its latching position, the face 72 being at such an angle as to prevent any inward movement of the pin 70 and the pin having to move inwardly to move to the left to clear the face 72. However, when the arm 36 is not being urged counterclockwise, a slight clearance between the pin 70 and the face 72 permits free movement of the pin 70, against its spring, to the left to clear the face 72.

The arms 30, 36 and 42 are in readily accessible, easily seen positions, and since their movements are pivotal only, do not bind on the bolts 32 and 38 while fitting closely thereon. The arms 30, 36 and 42 also are on the upper portions of the body 10 so as to provide a large space therebelow for the friction shoe. The arms also cover the space between the sidearms to prevent accumulation of mud, ice, snow and debris. Also, since no sidewise movement of the arms is required, no side clearance space to accumulate snow or ice is present.

What is claimed is:
1. In a double lock trailer coupling,
a body having an upwardly extending pintle,
a retainer arm above the pintle and pivotal upwardly on the body about a first axis from a lower closed position relative to the pintle to a raised open position relative to the pintle,
a first latching arm above the retainer arm and pivotal upwardly on the body about a second axis from a latching position locking the retainer arm in its closed position to a raised second position permitting movement of the retainer arm from its closed position toward its open position,
and a second latching arm above the first latching arm and pivotal on the body between a holding position positively locking the first latching arm in its latching position and a releasing position permitting movement of the first latching arm to its second position,
all of the arms being accessible from the top of the coupling,
the first latching arm being provided with a stop and the second latching arm being pivotal about an axis offset from said second axis and provided with a pin overhanging the first arm and engaging the stop when the arms are both in latching positions,
the first latching arm also being provided with a latching face which the pin engages when the arms are in their latching positions and the second latching arm being movable to a position providing clearance for the first latching arm when the second latching arm has been moved away from its latching position,
the second latching arm being in a position substantially perpendicular to the first latching arm when the arms are in their latching positions.
2. The double lock trailer coupling of claim 1 wherein the second latching arm is pivotal about said first axis.
3. The double lock trailer coupling of claim 2 wherein
the first latching arm has a recess providing clearance for the second latching arm when the second latching arm is moved in an unlatching direction from its latching position.
4. In a double lock trailer coupling,
a body having at the rear end thereof a vertical mounting plate adapted to be bolted to a tractor vehicle,
a pair of laterally spaced, vertical sidewalls secured to the front face of the mounting plate and a pintle extending forwardly and upwardly from the lower portions of the sidewalls, the side plates having a first pair of aligned holes positioned near the mounting plate and at the upper ends of the side plates and also having a second pair of aligned holes positioned below and to the rear of the first pair of aligned holes, a first bolt extending through the first pair of aligned holes, a second bolt extending through the second pair of aligned holes, a retainer arm pivotal on the second bolt between a generally horizontal latching position in which its free end rests on the upper end of the pintle and an open position swung upwardly away from the pintle, the retainer arm having a forwardly facing stop face, a first latching arm having a latching face and mounted pivotally on the first bolt for movement between a latching position in which the latching arms rests on the retainer arm with the latching face closely adjacent the stop face and preventing movement of the stop face therepast, a second, releasing position in which the latching face is just above the stop face and pivotal movement of the retainer arm is permitted and a retracted position extending primarily upwardly, the first latching arm having a notch-like portion intermediate its ends and a clearance recess positioned adjacent and forwardly of the notch-like portion, and a second latching arm having a laterally projecting pin and mounted pivotally on the second bolt for movement from a latching position in which the pin overhangs the first latching arm and is in the notch-like portion through a releasing position in which the pin overhangs the recess to a retracted position.

5. The double lock trailer coupling of claim 4 wherein the first arm has a camming surface forming one wall of the recess and adapted to engage the pin and move the second latching arm to its retracted position as the first latching arm is moved to its retracted position, and spring means urging at least the second latching arm toward its latching position.

6. The double lock trailer coupling of claim 5 wherein the spring means includes a torsion spring on the second bolt, one end portion of the torsion spring being secured to one of the sidewalls and the other end portion thereof bearing against the second latching arm and urging the second latching arm toward its latching position.

7. The double lock trailer coupling of claim 5 wherein the retainer arm has a projecting portion near the outer end thereof and the first latching arm has a hook-like portion adapted to hook over the projecting portion when the retainer arm is in its open position.

8. The double lock trailer coupling of claim 5 wherein the mounting plate has an opening below the bolts for a friction shoe actuator and there is a space between the sidewalls and below the arms for a friction shoe.

9. In a double lock trailer coupling, a body having an upwardly extending pintle, a retainer arm pivotal on the body about a first axis between a closed position relative to the pintle and an open position relative ot the pintle, a first latching arm pivotal on the body about a second axis between a latching position locking the retainer arm in its closed position and a second position permitting movement of the retainer arm from its closed position toward its open position, and a second latching arm pivotal on the body between a holding position positively locking the first latching arm in its latching position and a releasing position permitting movement of the first latching arm to its second position, the second latching arm being pivotal about said first axis, the first latching arm having a stop thereon limiting pivotal movement of the second latching arm in a latching direction to a latching position latching the first latching arm in its latching position, the first latching arm having a recess providing clearance for the second latching arm when the second latching arm is moved in an unlatching direction from its latching position, the second latching arm being alongside of the first latching arm and having a pin portion projecting laterally therefrom over the first latching arm, the first latching arm having a cam surface along one side of the recess for engaging the pin when the second latching arm has been moved a short distance from its latching position and the first latching arm has been moved a short distance from its latching position, the cam surface serving to push against the pin and swing the second latching arm further from its latching position when the first latching arm is swung further from its latching position.

10. The double lock trailer coupling of claim 9 including spring means biasing the first and second latching arms toward the latching positions thereof.

11. The double lock trailer coupling of claim 9 wherein the first latching arm is urged by gravity toward its latching position.

12. In a double lock trailer coupling, a body having an upwardly extending pintle, a retainer arm pivotal on the body about a first axis between a closed position relative to the pintle and an open position relative to the pintle, a first latching arm pivotal on the body about a second axis between a latching position locking the retainer arm in its closed position and a second position permitting movement of the retainer arm from its closed position toward its open position, and a second latching arm pivotal on the body between a holding position positively locking the first latching arm in its latching position and a releasing position permitting movement of the first latching arm to its second position, the second latching arm being pivotal about said first axis, the retainer arm having a stop block thereon having a first stop face positioned near the free end of the retainer arm and a second stop face positioned nearer the first axis than the first face, the first latching arm having a hook-like projection adapted to abut the second stop face when the retainer arm and the first latching arm are in their closed and latching positions and hook over the first stop face when the retainer arm is in its open position.

References Cited

UNITED STATES PATENTS 2,217,148  10/1940  Weiss _____ 280—509
2,842,380  7/1958   Weiss _____ 280—504

LEO FRIAGLIA, Primary Examiner

ROBERT R. SONG, Assistant Examiner